C. G. HUMPHREY.
AUTOMATIC COUPLING FOR MINE CARS.
APPLICATION FILED JUNE 8, 1920.
1,368,153.
Patented Feb. 8, 1921.
2 SHEETS—SHEET 1.
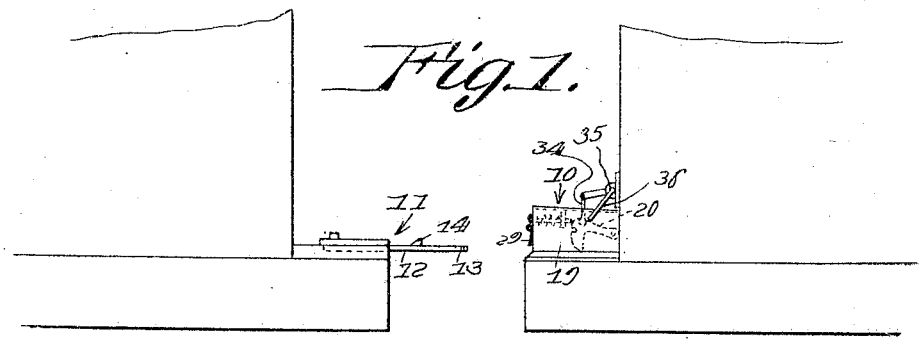
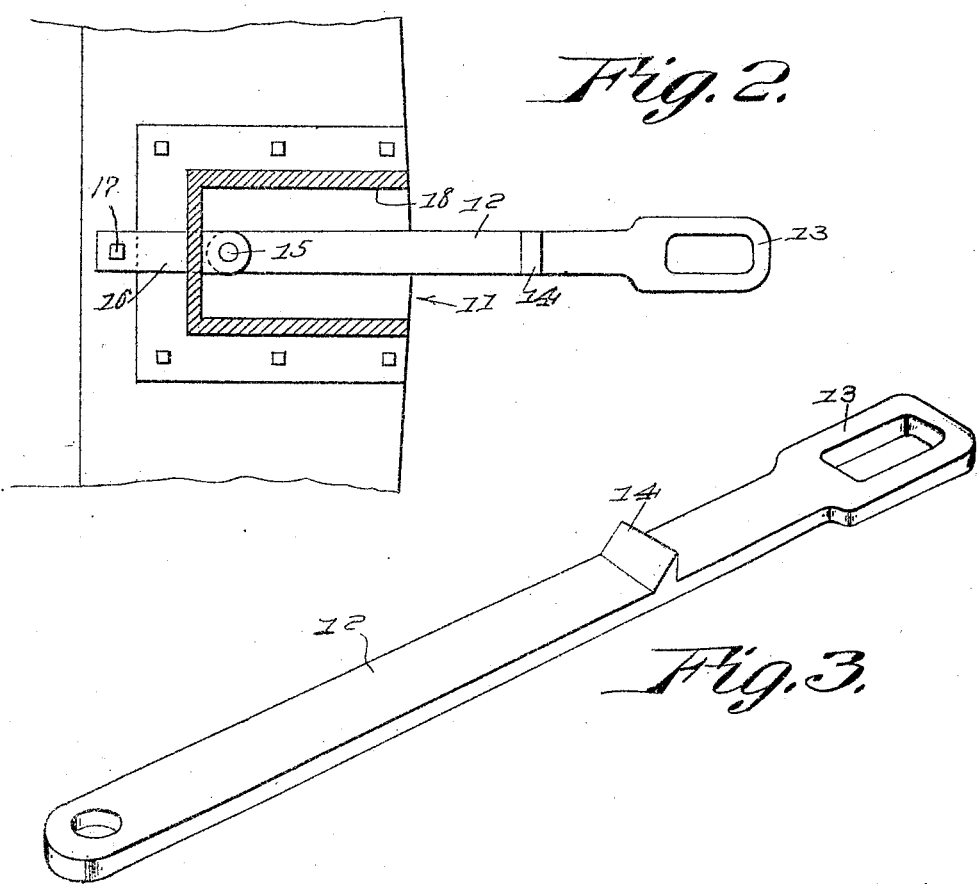

UNITED STATES PATENT OFFICE.

CHURCH G. HUMPHREY, OF WILCOE, WEST VIRGINIA.

AUTOMATIC COUPLING FOR MINE-CARS.

1,368,153.  Specification of Letters Patent.  Patented Feb. 8, 1921.

Application filed June 8, 1920. Serial No. 387,394.

*To all whom it may concern:*

Be it known that I, CHURCH G. HUMPHREY, a citizen of the United States of America, residing at Wilcoe, in the county of McDowell and State of West Virginia, have invented new and useful Improvements in Automatic Couplings for Mine-Cars, of which the following is a specification.

The object of the invention is to provide a simple, inexpensive and durable coupling device adapted especially for use in connection with mine cars, capable of withstanding the rough usage to which a device for that purpose is subjected, the relation between the coupling members being such as to facilitate the automatic engagement thereof when two cars are brought into coupling relation, and with this object in view, the invention consists in a construction and combination of parts, of which a preferred embodiment is shown in the accompanying drawings, wherein:—

Figure 1, is a side view showing the complemental members of the coupling device.

Fig. 2, is a plan view of one of the coupling members.

Fig. 3, is a detail in perspective of the coupling link.

Figure 4:
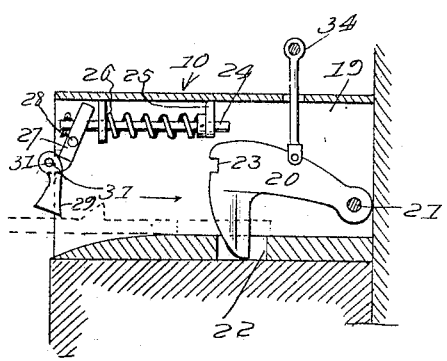
Fig. 4, is a sectional view taken on a vertical plane of the coupling member which incloses the hook.
Figure 5:
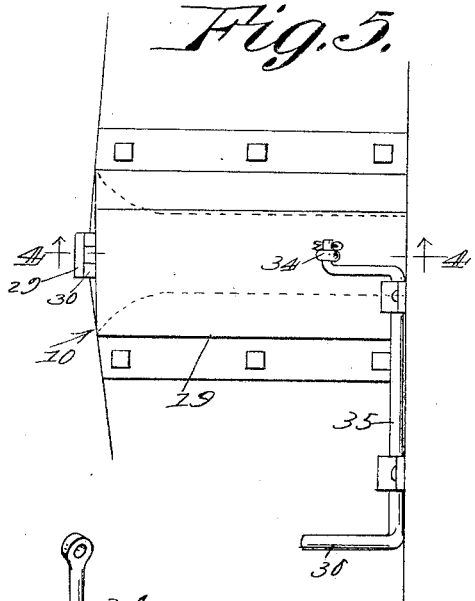
Fig. 5, is a plan view of the member illustrated in Fig. 4.
Figure 6:
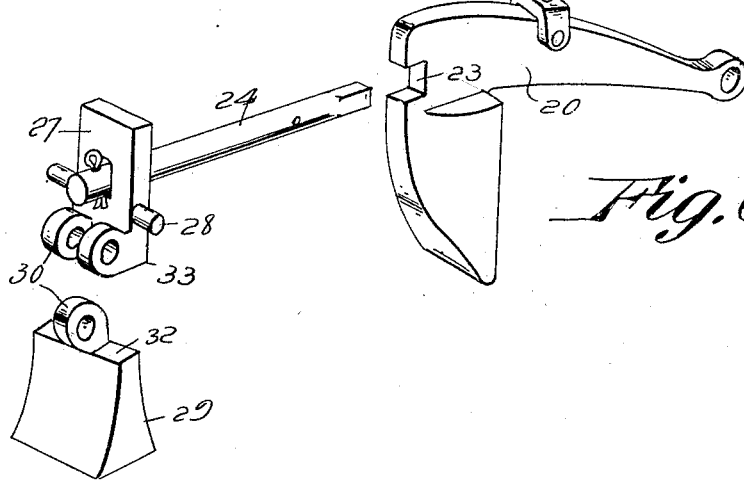
Fig. 6, is a perspective view with the parts detached of the coupling members shown in Figs. 4 and 5.

The apparatus consists essentially of the coupling members 10 and 11 of which the latter embodies essentially a link 12 having a terminal elongated eye 13, a trip shoulder 14, the shank of said link being pivoted as at 15 to a keeper 16 adapted to be rigidly secured to the frame of the car as indicated at 17, the inner or pivoted end of said shank being arranged in a guiding housing or draw head 18 so as to limit the lateral or pivotal movement thereof.

The other member of the coupler embodies in addition to the housing or draw head 19, a hook 20 mounted therein on a horizontal pivot 21 and adapted to engage the eye 13 of the link member of the coupler, the lower wall of the housing 19 having a seat 22 for the reception of the hook. In the face or outer side of the hook, there is formed a notch 23 adapted for engagement by the extremity of a locking pin 24 mounted in suitable guides 25 in the housing and yieldingly held in engaging position by a spring 26 and in operative relation with the locking pin is a trip 27 fulcrumed as at 28 for tilting movement, to the end that when the lower extremity thereof is reversed or moved in the direction indicated by the arrow in Fig. 4 the locking pin will be withdrawn from engagement with the hook to release the latter for engagement with the eye of the link.

Pivotally mounted upon the lower end of the trip is a weighted tappet 29 depending in the path of the link entering the draw head 19 and adapted to be engaged by the trip shoulder 14 as the link advances into the draw head, to thus release the coupling hook to permit the engagement thereof with the link. The tappet 29 is connected with the trip by a stop hinge consisting of the registering eyes 30 engaged by the pivot 31 and shoulder 32 for engagement with a corresponding shoulder 33 on the trip so that while the tappet is free to swing outwardly or forwardly when the link is withdrawn from the housing or draw head, the engagement with the tappet and the trip shoulder 14 on a link moving inwardly or toward the hook, will cause the tilting movement of the trip and hence the withdrawing of the locking pin 24 from engagement with the coupling hook.

The coupling hook is adapted to be disengaged from the link by means of a flexible connection 34 with a rock shaft 35 mounted upon the end of the car and having a terminal handle 36. When the rock shaft is moved to raise the coupling hook and thus disengage it from the coupling link it is locked in the elevated or disengaged position by the seating of the terminal of the locking pin in the notch 23 and thus the relation of the parts is maintained until the insertion into the draw head of the coupling link serving as above noted through engagement with the tappet 29 of the trip to disengage said locking pin and release the coupling hook which falling by gravity is in position to engage the eye 13 of the link.

The invention having been described, what is claimed as new and useful is:—

1. A car coupler having its members provided respectively with a link and hook for engaging a terminal eye on the link, the hook being releasably held in its engaging position, a locking pin yieldingly holding the hook in its disengaged position, and a trip operatively connected with the locking pin and having a dependent tappet disposed in the path of a link when approaching the hook, said tappet having a stop hinge connection with the trip and the link having a trip shoulder for engagement with the tappet.

2. A car coupler having its members provided respectively with a laterally movable link provided with a terminal eye and pivoted hook for engagement with said eye, a spring actuated locking pin for terminal engagement with a notch in said hook for maintaining the latter in its disengaged position with relation to the path of the link, a pivotal trip connected with the locking pin, and a pendent tappet having a stop hinge connection with the trip and disposed in the path of the link when approaching the said hook, the link having a trip shoulder for engagement with said tappet during the movement of the link into engaging relation with the said hook.

In testimony whereof I affix my signature.

CHURCH G. HUMPHREY.